United States Patent Office 2,908,673
Patented Oct. 13, 1959

2,908,673

POLYMERIZATION OF CONJUGATED DIOLEFINS WITH A CATALYST CONSISTING OF A BINARY ALLOY OF A GROUP II-A METAL AND A GROUP III-A METAL

Harold Leonard Jackson, Wilmington, Del., assignor to E. I. du Pont de Nemours and Company, Wilmington, Del., a corporation of Delaware No Drawing. Application March 21, 1957
Serial No. 647,498

13 Claims. (Cl. 260—94.2)

This invention relates to a new process for polymerizing 1,3-dienes.

A continuing goal for research in the field of synthetic rubber technology has been the development of an artificial rubber with properties approximating very closely those of natural Hevea rubber. One of the difficulties encountered has been obtaining a polyisoprene with the cis-1,4 internal structure of the natural product [for possible structures see, for example, Ind. and Eng. Chem., 48, 785, Figure 1 (1956)].

Recently, the proportion of the cis-1,4-isomeric structure in artificial rubber has been increased by the use of finely-divided lithium dispersed in petroleum jelly as a catalyst for the polymerization of isoprene. [Ind. and Eng. Chem., 48, 778–783 (1956)]. Lithium, however, is a relatively rare and expensive metal and is somewhat difficult to handle.

A general object of this invention is provision of a novel process for polymerizing 1,3-dienes.

Another object is provision of a method for polymerizing 1,3-diene hydrocarbons, isoprene in particular, that gives improved yields of the cis-1,4-isomer.

A further object is provision of a novel method for polymerizing 1,3-diene hydrocarbons with enhanced yields of the cis-1,4-isomer which avoids some of the disadvantages of methods used heretofore.

The above-mentioned and yet further objects are achieved in accordance with this invention by a process in which a 1,3-diene monomer is polymerized in contact with a catalyst consisting of finely-divided alloy of a metal of group II-A of the periodic system with a metal of group III-A having an atomic number of less than 50.

In practice a reactor which has been purged of moisture and oxygen by sweeping it with an inert gas, e.g., argon, is charged with a comminuted alloy of a group II-A metal and a group III-A metal of atomic number less than 50, e.g., an alloy of calcium and aluminum, a dry inert organic solvent, stainless steel balls (⅜″ diameter), evacuated and further charged with the selected 1,3-diene. The reactor is closed and shaken at 25–120° C. for from 1–24 hours. Thereafter the reactor is opened, the contents discharged and the desired polymer is isolated by methods well known to those skilled in the art.

It will be understood that the process outlined can be used for copolymerization as well as homopolymerization.

The group II-A metals employed in the catalytic alloys are magnesium, calcium, strontium and barium. The group III-A metals of atomic number less than 50 are aluminum, gallium and indium. The metallic groupings employed here are those of the Periodic System published by the Fisher Scientific Company (1956).

The ratio of group II-A to group III-A metals in the alloy in terms of weight percent may vary from 99:1 to 1:99. The alloys which give the best results are those in which the ratio of group II-A to group III-A metal in weight percent is from 49:1 to 4:1.

The comminuted alloy in the form of powder or of turnings is employed in amount varying from 0.1–10% by weight of the 1,3-diene being polymerized. The best results from the standpoint of reaction rate and polymer yield per unit weight of catalyst are obtained using from 0.5–5% by weight and this constitutes the amount most generally used.

Any 1,3-diene can be polymerized in accord with this invention. For practical reasons the 1,3-dienes employed are those which contain up to 12 carbon atoms and which conform to the general formula:

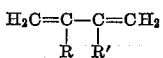

in which the R's are hydrogen, halogen or hydrocarbon radicals. The R's may also be combined to form a single divalent hydrocarbon radical. Preferably the R's are monovalent hydrocarbon radicals, especially short chain alkyl radicals, i.e., containing not more than 6 carbon atoms, and phenyl. Especially preferred are the 1,3-butadienes. Examples are 1,3-butadiene, 2-methyl-1,3-butadiene, 2-chloro-1,3-butadiene, 2-phenyl-1,3-butadiene, 2-fluoro-1,3-butadiene, 1,2,4-trimethylenecyclohexane, and the like. For the preparation of the last-named compound see Example 6 of my application Serial No. 647,496, filed of even date herewith.

The polymerization is usually carried out at temperatures in the range of 25–120° C. Because the best yields of polymer at good reaction rates are obtained within the more restricted range of 40–85° C., this range embraces the temperature conditions usually employed.

Pressure is not particularly critical in the process of the invention and autogenous reaction pressure will generally be employed.

Reaction time is likewise not critical. Several hours, e.g., up to 24, are, however, generally used to ensure a good yield.

Although a reaction medium is not essential, one is generally utilized in practice. Useful media are cyclohexane, methyl cyclohexane, n-pentane, n-hexane, tetrahydro- and decahydronaphthalenes, etc. When a reaction medium is used it may vary from one-half to 50 times the weight of the 1,3-diene.

In the preferred practice, steel balls are included in the reaction charge to provide a milling action during the polymerization. The steel balls are conveniently of ⅜″ diameter but there is nothing critical about this figure. The balls can occupy from one-fifth to one-tenth of the reaction volume.

The examples which follow illustrate but do not limit this invention. Percentages and the ratios of metals in the catalysts employed are given in terms of weight.

EXAMPLE 1

*Polymerization of butadiene with calcium-aluminum alloy*

(A) Into a 400 ml. stainless steel-lined pressure vessel, which had been purged with argon, were placed 2.0 g. of turnings of a 95/5 calcium-aluminum alloy; 40 ml. of cyclohexane previously dried with sodium; and 25 stainless steel balls (⅜″ diameter). The pressure vessel was again flushed with argon, closed, and cooled in a Dry Ice-acetone mixture. The cold vessel was partially evacuated and 54 g. of butadiene was distilled into it. The mixture was then shaken at 50° C. under autogenous pressure for 18 hours. When the pressure vessel was opened, it contained a rubbery mass of polymer. The finely-divided alloy was removed from the polymer by treating the polymer with carbon disulfide and filtering the resulting polymer solution. The polymer had formed in essentially complete conversion.

Examination of the infrared spectrum of this polybutadiene according to the method of Hampton, Anal. Chem., 21, 923–6 (1949), indicated that the polymer contained 57.5% of cis-1,4-units, 18.5% of 1,2-units and 11.5% of trans-1,4-units. See the table which follows for comparison with other polybutadienes.

TABLE.—POLYBUTADIENES

| Catalyst | Percent Cis-1,4 | Percent Trans-1,4 | Percent 1,2 |
|---|---|---|---|
| 95/5 Ca/Al [1] | 57.5 | 11.5 | 18.5 |
| Al | No polymerization | | |
| Persulfate (emulsion system) [1] | 16 | 57 | 19 |
| K [2] | 15 | 40 | 45 |
| Na [2] | 10 | 25 | 65 |
| Li [2] | 35 | 52 | 13 |

[1] The percent cis-1,4, percent trans-1,4 and percent 1,2 are derived from the infrared data. These values do not total 100% because of experimental errors.
[2] The values are taken from data published in "Advances in Chemistry," Series No. 19, American Chemical Society, p. 27 (May 1957).

(B) In contrast to the above result, only 3.7 g. of high-boiling viscous liquid together with a gummy polymer was obtained from butadiene and calcium metal turnings under the conditions of the above experiment.

Substitution of 3.0 g. of 100-mesh aluminum powder for the calcium-aluminum turnings of the above experiment likewise failed to polymerize butadiene.

In another controlled experiment in which no metal other than the stainless steel reaction vessel and the stainless steel balls were used, only 2.0 g. of a rubbery solid and a high-boiling liquid were formed.

EXAMPLE 2

*Polymerization of isoprene with a calcium-aluminum alloy*

A 400-ml. stainless steel-lined pressure vessel was purged with argon and charged with 4.0 g. of 95/5 calcium-aluminum alloy turnings, 45 ml. of dry cyclohexane, 25 stainless steel balls (⅜" diameter), and 57.2 g. of freshly purified isoprene. The pressure vessel was closed and shaken at 75° C. under autogenous pressure for 16 hours. From the reaction product was isolated 11 g. of a rubbery polymer. This polymer was readily soluble in carbon disulfide. The infrared spectrum of this polyisoprene was quite similar to that of natural rubber and indicated an all-cis structure containing about 70% of 1,4-linkages and about 30% of 3,4-linkages.

The isoprene used in this experiment was dried by reflux over sodium ribbon followed by distillation after which it was passed through a column of silica gel. Contact with air and moisture was prevented by handling the isoprene under argon.

EXAMPLE 3

*Polymerization of chloroprene with a calcium-aluminum alloy*

Using the same procedure described in Example 1, 48 g. of chloroprene (2-chloro-1,3-butadiene), was converted to a rubbery polymer soluble in carbon disulfide. The chloroprene used in this experiment was distilled immediately before use and passed through a column of silica gel under an atmosphere of argon.

EXAMPLE 4

*Polymerization of butadiene with a calcium-indium alloy*

Substitution of 4.0 g. of 90/10 calcium-indium alloy turnings for the calcium-aluminum alloy of Example 1 also brought about the polymerization of butadiene to a high molecular weight rubbery polymer. From 54 g. of butadiene monomer was obtained 6.5 g. of polybutadiene.

EXAMPLE 5

*Polymerization of chloroprene with a calcium-indium alloy*

The procedure of Example 3 was followed except that the calcium-aluminum alloy was replaced with 2.0 g. of 90/10 calcium-indium alloy turnings. After shaking at 50° C. under autogenous pressure for 16 hours, there was obtained 14 g. of polychloroprene from 37 g. of chloroprene monomer.

The polymers of the diene hydrocarbons obtained in accord with the process of this invention possess rubber-like properties. In addition, those from the diene hydrocarbons possess essentially a cis-structure with a major portion conforming to a 1,4-configuration. These polymers are superior to conventional synthetic rubbers in having low hysteresis and excellent properties at elevated temperatures and thus resemble natural rubber in many of its essential properties.

The process of this invention makes it possible for the first time to polymerize a 1,3-diene hydrocarbon to a high polymer closely matching natural rubber in its essential properties, employing a low-cost catalyst. These synthetic rubbers are admirably adapted for use in tires and in other applications where good properties at elevated temperatures are required.

Since obvious modifications in the process of this invention will occur to those skilled in the chemical arts, I propose to be bound solely by the appended claims.

The embodiments of the invention in which an exclusive property or privilege is claimed are defined as follows:

1. The process for the polymerization of at least one 1,3-diene having up to 12 carbon atoms and of the formula $$H_2C=C-C=CH_2$$
$$\phantom{H_2C=}\!R\phantom{-C=}\!R'$$

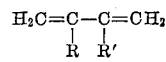

wherein R and R' are selected, in sufficient number to satisfy the valences of the carbons to which they are attached, from the group consisting of hydrogen, halogen, monovalent hydrocarbon radicals and, taken together, a divalent hydrocarbon radical, which comprises contacting said 1,3-diene with about 0.1–10% by weight, based on the weight of 1,3-diene, of a catalyst consisting essentially of a binary alloy of a metal of the first group consisting of magnesium, calcium, strontium and barium with a metal of the second group consisting of aluminum, gallium and indium, the weight ratio of the metals in said binary alloy being in the range 1:99 to 99:1, at a temperature of about 25–120° C. for a period sufficient to form a polymer.

2. The process of claim 1 in which the 1,3-diene is contacted with the catalyst in an inert organic reaction medium.

3. The process of claim 2 in which the inert organic reaction medium is a liquid hydrocarbon.

4. The process of claim 3 in which the liquid hydrocarbon is cyclohexane.

5. The process of claim 1 in which the catalyst is an alloy of calcium and aluminum.

6. The process of claim 1 in which the catalyst is an alloy of calcium and indium.

7. The process of claim 1 in which the 1,3-diene is butadiene.

8. The process of claim 1 in which the 1,3-diene is isoprene.

9. The process of claim 1 in which the 1,3-diene is chloroprene.

10. The process of claim 1 in which the temperature is about 40–85° C.

11. The process of polymerizing butadiene which comprises contacting the same with about 0.1–10% by weight, based on the weight of the butadiene, of a catalyst consisting essentially of a binary alloy of calcium and a second metal selected from the group consisting of aluminum, gallium and indium, the weight ratio of the metals in said binary alloy being in the range from 1:99 to 99:1, at a temperature of about 25–120° C. for a period sufficient to form a polymer.

12. The process of polymerizing isoprene which comprises contacting the same with about 0.1–10% by weight, based on the weight of the isoprene, of a catalyst consisting essentially of a binary alloy of calcium and a second metal selected from the group consisting of aluminum, gallium and indium, the weight ratio of the metals in said binary alloy being in the range from 1:99 to 99:1, at a temperature of about 25–120° C. for a period sufficient to form a polymer.

13. The process of polymerizing chloroprene which comprises contacting the same with about 0.1–10% by weight, based on the weight of the chloroprene, of a catalyst consisting essentially of a binary alloy of calcium and a second metal selected from the group consisting of aluminum, gallium and indium, the weight ratio of the metals in said binary alloy being in the range from 1:99 to 99:1, at a temperature of about 25–120° C. for a period sufficient to form a polymer.

References Cited in the file of this patent

UNITED STATES PATENTS

| | | |
|---|---|---|
| 1,058,056 | Harries | Apr. 8, 1913 |
| 1,073,116 | Harries | Sept. 16, 1913 |
| 2,495,278 | Nickels | Jan. 24, 1950 |
| 2,784,147 | Strecker et al. | Mar. 5, 1957 |